(12) United States Patent
Saieg et al.

(10) Patent No.: US 8,025,302 B2
(45) Date of Patent: Sep. 27, 2011

(54) TRAILER SLIDER LOCKING SYSTEM

(75) Inventors: Steven G. Saieg, Rochester Hills, MI (US); Vern A. Caron, Kalamazoo, MI (US)

(73) Assignee: ArvinMeritor Technology, LLC, Troy, MI (US)

(*) Notice: Subject to any disclaimer, the term of this patent is extended or adjusted under 35 U.S.C. 154(b) by 1595 days.

(21) Appl. No.: 11/141,628

(22) Filed: May 31, 2005

(65) Prior Publication Data

US 2006/0267306 A1 Nov. 30, 2006

(51) Int. Cl.
*B62D 61/12* (2006.01)
(52) U.S. Cl. .................. 280/149.2; 280/407.1; 180/209
(58) Field of Classification Search ............... 280/149.2, 280/407.1; 267/170, 179; 292/10, 127; 180/209
See application file for complete search history.

(56) References Cited

U.S. PATENT DOCUMENTS

| | | | | |
|---|---|---|---|---|
| 2,935,332 A | | 5/1960 | Delay | |
| 3,087,741 A | * | 4/1963 | De Lay | 280/81.1 |
| 3,379,453 A | * | 4/1968 | Fujioka | 280/81.1 |
| 3,618,969 A | * | 11/1971 | Glassmeyer | 280/149.2 |
| 3,778,079 A | * | 12/1973 | Vornberger et al. | 280/149.2 |
| 4,777,810 A | * | 10/1988 | Webster | 70/150 |
| 4,838,566 A | | 6/1989 | Baxter | |
| 4,838,578 A | | 6/1989 | Baxter | |
| 4,955,629 A | * | 9/1990 | Todd et al. | 280/407 |
| 5,346,233 A | * | 9/1994 | Moser | 280/149.2 |
| 5,460,237 A | * | 10/1995 | Schueman | 180/209 |
| 5,462,301 A | * | 10/1995 | Schueman | 280/149.2 |
| 5,474,149 A | * | 12/1995 | Schueman | 180/209 |
| 5,480,171 A | * | 1/1996 | Cheffey | 280/149.2 |
| 5,507,511 A | * | 4/1996 | Schueman | 280/149.2 |
| 5,564,727 A | * | 10/1996 | Wessels | 280/407.1 |
| 5,620,195 A | * | 4/1997 | Wessels | 280/149.2 |
| 5,642,896 A | * | 7/1997 | Pierce et al. | 280/149.2 |
| 5,758,890 A | * | 6/1998 | Wessels | 280/149.2 |
| 5,813,682 A | * | 9/1998 | Stevens | 280/149.2 |
| 6,122,946 A | * | 9/2000 | Blanch | 70/473 |
| 6,435,536 B2 | * | 8/2002 | Eckelberry | 280/407.1 |
| 6,471,227 B2 | * | 10/2002 | Eckelberry et al. | 280/149.2 |
| 6,485,054 B1 | * | 11/2002 | Yurgevich | 280/789 |
| 6,488,303 B1 | * | 12/2002 | Cobb | 280/407.1 |
| 6,641,157 B2 | * | 11/2003 | Eckelberry et al. | 280/149.2 |
| 6,921,100 B2 | * | 7/2005 | Mantini et al. | 280/407 |
| 7,163,220 B2 | | 1/2007 | Pappas | |
| 7,188,684 B2 | * | 3/2007 | Nolan | 175/57 |

FOREIGN PATENT DOCUMENTS

WO 0043255 7/2000

\* cited by examiner

*Primary Examiner* — Paul N Dickson
*Assistant Examiner* — Timothy Wilhelm
(74) *Attorney, Agent, or Firm* — Carlson, Gaskey & Olds

(57) ABSTRACT

A trailer slider locking system includes body rails longitudinally slidable relative to a suspension frame side rail. The body rails have holes providing multiple suspension positions. A pin locking system includes a pin moveable between retracted and locked positions. An end of the pin is received in one of the holes in the locked position. The pin has a first centerline and the holes have a second centerline. The end of the pin extends through the hole with the centerlines being offset from one another in the locked position. The pins have tapered ends so that the pin will extend through the body rail hole prior to advancing to the fully locked position.

20 Claims, 4 Drawing Sheets

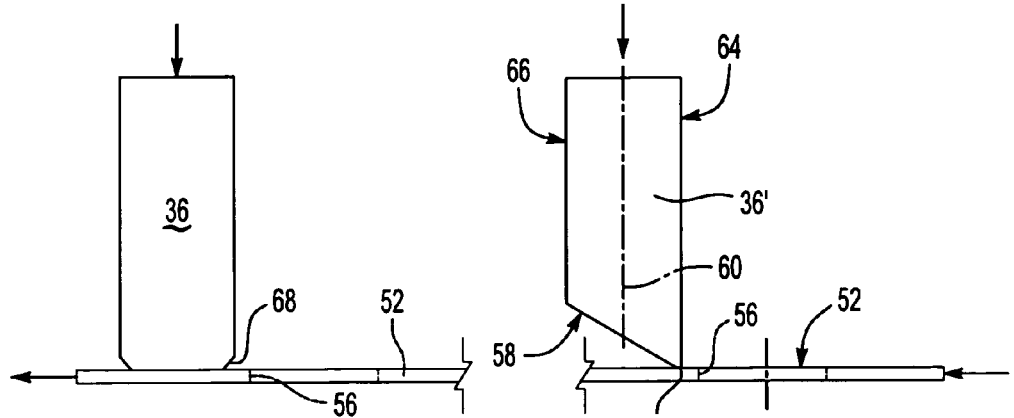
*Fig-3A*
PRIOR ART
*Fig-3B*
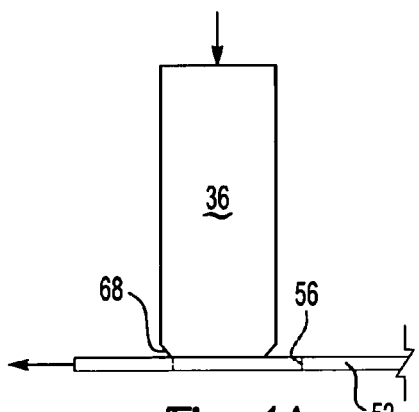
*Fig-4A*
PRIOR ART
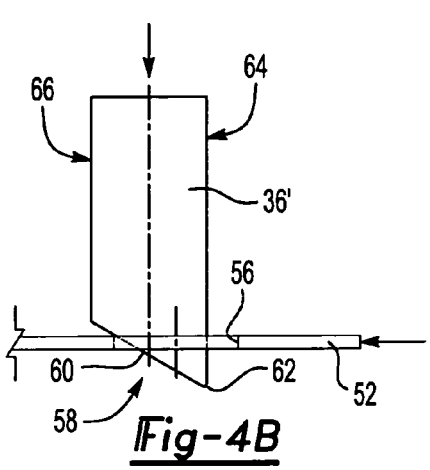
*Fig-4B*
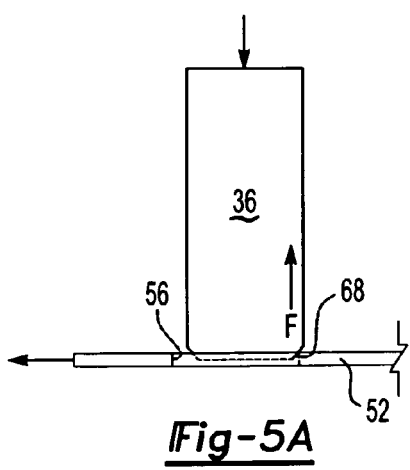
*Fig-5A*
PRIOR ART
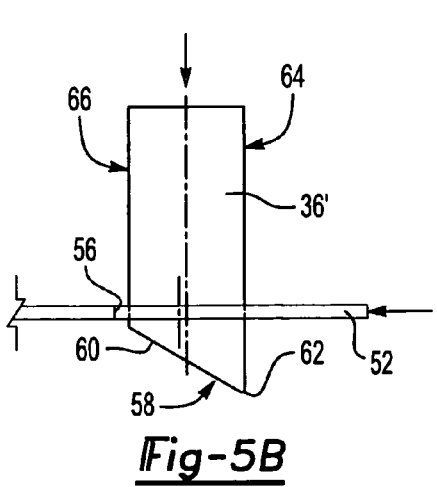
*Fig-5B*

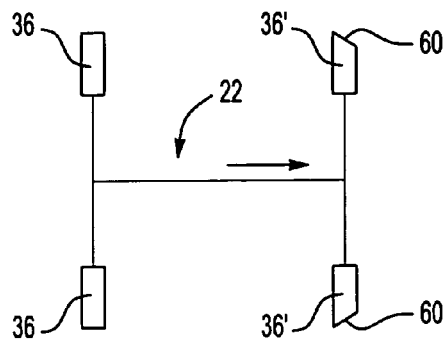
*Fig-6A*
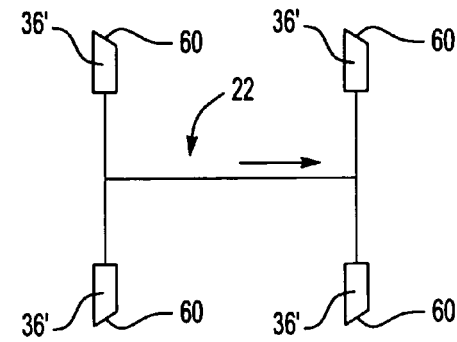
*Fig-6B*
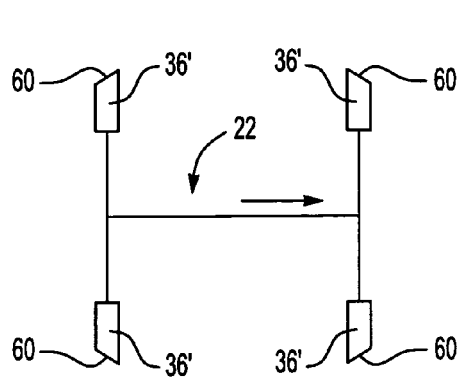
*Fig-6C*
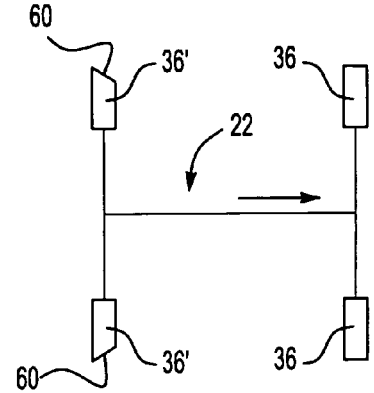
*Fig-6D*
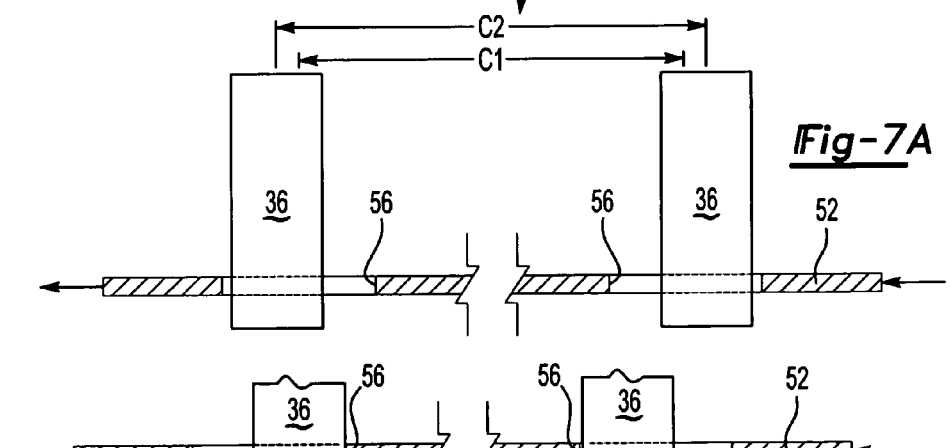
*Fig-7A*
*Fig-7B*

TRAILER SLIDER LOCKING SYSTEM

BACKGROUND OF THE INVENTION

The present invention relates to a trailer slider locking system, and more particularly, the invention relates to a pin configuration that better ensures pin engagement with the body rails.

Trailer slider locking systems are utilized on tractor trailers to adjust the longitudinal position of a slider carrying the trailer suspension beneath the trailer body. Trailer body rails are supported on top of and slide relative to suspension frame side rails. The trailer body rails include a series of holes providing multiple body positions relative to the trailer suspension. A mechanical linkage supported on a slider, or trailer suspension frame is used to bias spring-loaded pins to a locked position in which the pins are received in holes in the trailer body rails. The pins lock the side and body rails together. The pins are moved to a retracted position using the mechanical linkage to longitudinally adjust the position of the trailer body rail relative to the trailer suspension frame.

Trailer locking systems often have a problem in which the pins do not engage the body rails or fully extend through the holes in the body rails. If the pins are not fully locked, the trailer body may sometimes slide relative to the trailer suspension frame during vehicle operation, possibly resulting in a damaging collision between the trailer body and suspension frame. For example, if hard braking occurs when the pins are not fully locked, prior art pins will jump past body rail holes as the trailer body rails move forward relative to the trailer suspension frame, which is being slowed or stopped due to braking. Therefore, what is needed is a trailer sliding locking system that enables better pin engagement in the locked position.

SUMMARY OF THE INVENTION AND ADVANTAGES

The inventive trailer slider locking system includes a pair of body rails longitudinally slidable relative to suspension frame side rails. The body rails have holes providing multiple suspension positions. A pin locking system includes a pin moveable between retracted and locked positions. An end of the pin extends through one of the holes in the locked position. The system typically includes at least one pin on each side. The pin has a first centerline and the holes have a second centerline. The end of the pin extends through the hole with the centerlines offset from one another in the locked position.

In one example of the invention, first and second holes along the body rail provide a distance that is greater than a distance provided by first and second locking pin centerlines. In another example, the distance between the first and second holes is less than the distance between the first and second locking pin centerlines. For example, the pins are smaller than the holes so that there is a greater longitudinal length along which the pins can be received in the body rail holes.

In another embodiment, the pins have tapered ends so that they pin will extend through the body rail hole prior to advancing to the fully extended and locked position. This ensures that the pin prevents relative movement between the trailer body and suspension frame even if the pin is not fully extended due to debris or misalignment.

Another feature of the invention includes an aperture in the pin on the opposite side of the pin end received in the body rail hole. The aperture permits an end of the linkage to be received within the aperture in the event that the pin cannot be advanced from the retracted position to the locked position. In this manner, if one of the pins cannot move to the fully locked position for some reason it will not prevent the other pins from moving to the locked position by inhibiting the movement of the mechanical linkage that actuates the pins.

Accordingly, the present invention provides a trailer sliding locking system that enables better pin engagement in the locked position.

BRIEF DESCRIPTION OF THE DRAWINGS

Other advantages of the present invention can be understood by reference to the following detailed description when considered in connection with the accompanying drawings wherein:

FIG. 3A is a schematic view of the prior art in a transient trailer body position.

FIG. 3B is a schematic view of the inventive pin in a transient trailer body position.

FIG. 4A is a schematic view of the prior in the transient embodiment position with the pin partially aligned with the body rail holes.

FIG. 4B is a schematic view of the inventive pin in the transient embodiment position with the pin partially aligned with the body rail holes.

FIG. 5A is a schematic view of the prior art with the trailer body in an aligned pin position with the centerline of the pin partially offset from the centerline of the trailer body hole.

FIG. 5B is a schematic view of the inventive pin with the trailer body in an aligned pin position with the centerline of the pin partially offset from the centerline of the trailer body hole.

FIG. 6A is a schematic view of one inventive pin configuration.

FIG. 6B is a schematic view of another inventive pin configuration.

FIG. 6C is a schematic view of another inventive pin configuration.

FIG. 6D is a schematic view of another inventive pin configuration.

FIG. 7A is a schematic view of an inventive pin arrangement in one position relative to the trailer body holes.

FIG. 7B is a schematic view of an inventive pin arrangement in another position relative to the trailer body holes.

DETAILED DESCRIPTION OF THE PREFERRED EMBODIMENT

Figure 1:
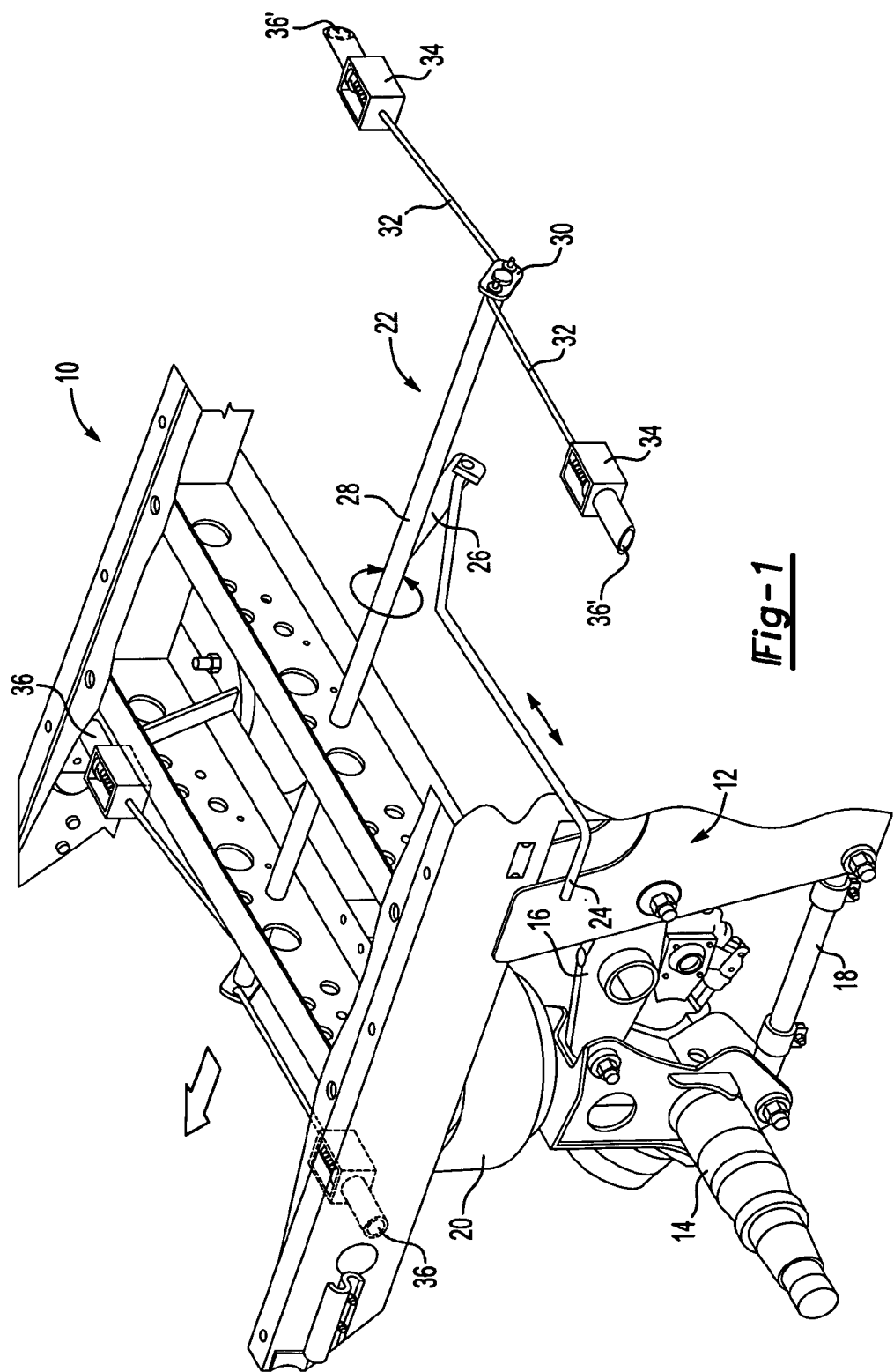
FIG. 1 is a perspective view of the inventive trailer slider locking system.

FIG. 1 depicts a trailer slider system 10 including a suspension frame 12 supporting an axle 14. The axle 14 is supported for articulation on the suspension frame 12 by upper 16 and lower 18 arms. An air bag 20 is arranged between the axle 14 and suspension frame 12. The suspension configuration shown in FIG. 1 is only exemplary, and one of ordinary skill in the art will understand that the inventive trailer slider system can be used with any suspension configuration.

A pin locking system 22 is supported on the suspension frame 12. The pin locking system 22 includes a handle 24 that is moved laterally by a vehicle operator to actuate the system between retracted and locked positions. While a manual system is shown, it should be understood that an automated or semi-automated system may also be used. The handle 24 is connected to a crank 26 secured to shaft 28 that is rotationally supported by the suspension frame 12. The shaft 28 includes a pair of cam mechanisms 30 each of which pivotally support ends of linkages 32. Cages 34 are secured to the suspension frame 12 and house pins 36 that are actuated by the linkages 32 between retracted and locked positions in response to manipulation of the handle 24. While the arrangement of four pins 36 as shown is typical, fewer or greater pins may also be used.

Figure 2A:
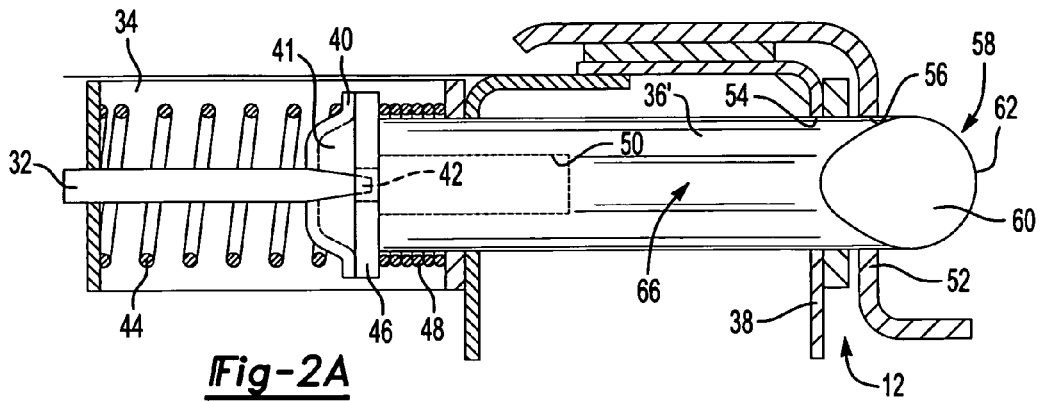
FIG. 2A is a cross-sectional view in a locked position.
Figure 2B:
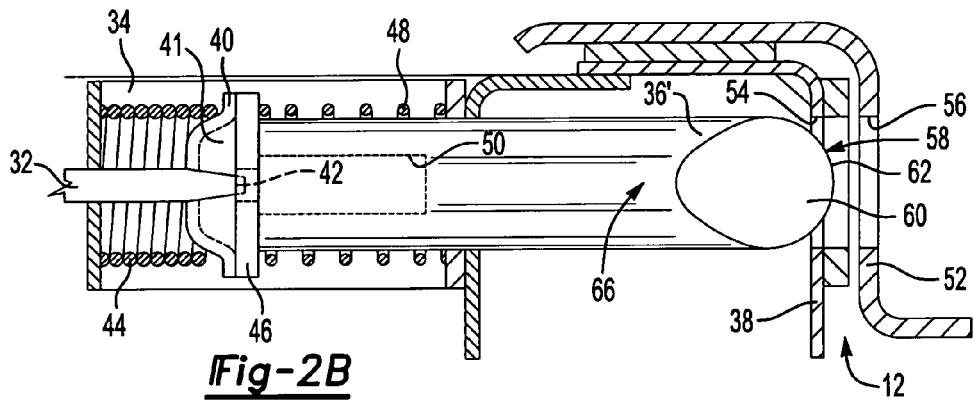
FIG. 2B is a cross-sectional view in a retracted position.

Referring to FIG. 2A, an inventive pin 36' is shown supported by a side rail 38 of the suspension frame 12. The cage 34 is supported on the side rail 38. An end 42 of the linkage 32 extends into the cage 34 for manipulating the inventive pin 36' between locked (FIG. 2A) and retracted (FIG. 2B) positions. An end cap 40 is secured to the end 42 and engages a flange 46 of the pin 36'. A first spring 44 biases the pin 36' to the locked position. The spring 44 is arranged between a rearward portion of the cage and the end cap 40. A second spring 48, which generates a biasing force less than the first spring 44, is arranged between the flange 46 and a forward portion of the cage 34 for biasing the pin 36' to the retracted position. The handle 24 is pulled outward to move the pins 36' from the locked position to the retracted position. The linkages 34 compress the first spring 44 by pulling it towards the rearward portion of the cage 34 with the end cap 40. Removing the biasing force of the first spring 44 from the flange 46 enables the second spring 48 to urge the pin 36' from the locked position (FIG. 2A) to the retracted position (FIG. 2B).

Figure 2C:
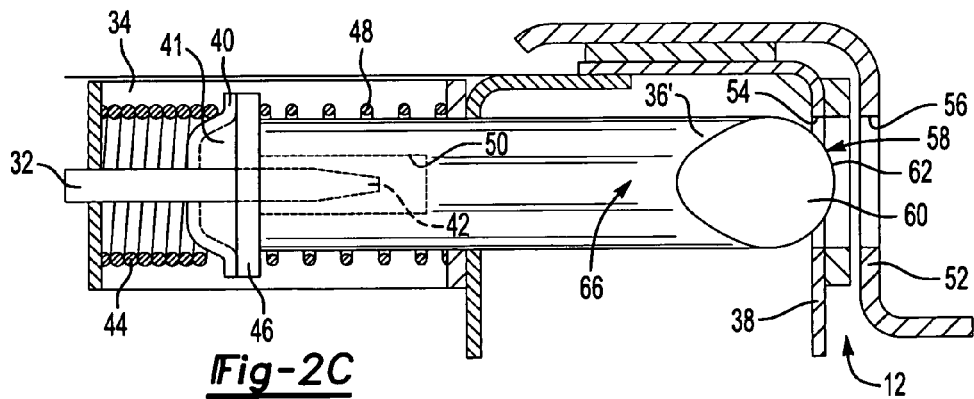
FIG. 2C is a cross-sectional view in a bound position.

Occasionally the pin 36' will bind in holes 54 in the side rails 38 or holes 56 in the body rails 52 when the handle 24 is pushed to return the pins 36' from the retracted position (FIG. 2B) to the locked position (FIG. 2A). In prior art arrangements, a binding pin or the pin being blocked by the body rails could prevent the other pins from being biased to the locked position by the first springs 44 because the end 42 of the linkage 32 associated with the bound pin 36' would collide with the rear of the pin 36'. This might prevent the other linkages 32 from moving toward the forward portions of the cages 34, which enables the first springs 44 to advance. To address this problem, one aspect of the present invention incorporates apertures 50 in the rear of the pins 36' to accommodate the end 42 of the linkage 32 if the pin 36' should bind, as shown in FIG. 2C. The end 42 extends into the aperture 50 permitting the other linkages to move toward the forward portion of the cage 34 permitting the first springs 44 to expand and bias the pins 36' to the locked positions.

In another feature of this invention, the inventive pins 36' include tapered ends 58 having tapered surfaces 60 that enable the pin end to extend through the body holes 56 even if the pins 36' do not fully align with the body holes 56. That is, the centerline of the pins 36' and body holes 56 can be offset by a substantial amount and yet the pins 36' will extend through the body holes 56 thereby preventing the body rails 52 from moving relative to the side rails 38 even if the pins 36' and body rail holes 56 are misaligned. Prior art systems have required relatively precise alignment between the centerlines of the pins and body rail holes, which has resulted in the pins not always fully engaging the body rails. This result may permit the body rails to move relative to the slider under braking conditions.

Referring to FIGS. 3B, 4B and 5B, the tapered end 58 includes an apex 62 at a terminal end of the pin 36'. In the example shown in the Figures, the pin 36' includes a periphery, which in one example is a cylindrical surface, having opposing sides 64, 66. The periphery is spaced axially from the apex 62 in the example shown, a tapered surface 60 extends from the apex 62, which lies along long side 64, to a short side 66 opposite the long side 64. In the example shown, the tapered surface 60 is a generally planar surface and the apex 62 is offset from the centerline. The tapered surface 60 enables the pin 36' to extend through the hole 56 in the body rail 52 prior to a centerline of the pin 36' and a centerline of the body hole 56 being substantially aligned. Thus, the body rail 52 is prevented from moving relative to the side rails 38 when the pins 36' are misaligned with the body holes 56. The flat provided by the tapered surface 60 prevents the pin 36' from rotating.

FIG. 3A depicts a prior art pin in a transient position, and FIG. 3B depicts the inventive pin 36' in the same transient position. As the position of the body rail 52 is adjusted by the vehicle operator, the pin 36' has not extended through the body rail hole 56, as shown in FIG. 4A with the prior art system. As shown with the inventive pin in FIG. 4B, the long side 64 of the pin 36' extends into the body hole 56. The long side 64 provides a surface that is normal to the body rail 52 so that forward movement of the body rail 52 will be prevented.

FIG. 5A depicts the prior art pin 36 in a position in which the pin is substantially aligned with the body hole 56. However, contact between an edge of the moving body rail hole 56 and chamfer 68 on the end of the pin 36 may create a force F that prevents the pin 36 from extending through the hole 56. The tapered surface 60 of the inventive pin 36' better ensures that the pin 36' continues to extend to the fully locked position as the tapered surface 60 slides along the edge of the body hole 56.

FIGS. 6A-6D generally depict several example pin locking systems 22 having different pin combinations and orientations. For example, FIG. 6A illustrates the inventive pins 36' arranged at the forward side of the trailer slider system with the tapered surfaces 60 facing forward. Conventional pins 36 are arranged at the rear side of the trailer slider system. Arranging the tapered surfaces 60 so they face forward better ensures that pins 36' will extend through the body holes 56 if the trailer body shifts forward during a braking operation, as illustrated in FIGS. 4B and 5B. FIG. 6B is similar to FIG. 6A except the inventive pins 36' are used at each of the four corners of the trailer slider system with tapered surfaces 60 facing forward. FIG. 6D is similar to FIG. 6A except the forward and rearward pins are swapped.

FIG. 6C illustrates a pin locking system 22 having the inventive pin 36' on each of the four corners with the tapered surfaces of the forward and rearward pin sets arranged in opposite directions. The forward pin set ensures that the trailer body is locked to the suspension frame if the body moves forward relative to the frame, and the rear pin set ensures that the trailer body locks to the suspension frame in the less likely event of the trailer body moving rearward relative to the suspension frame during vehicle operation with the pins misaligned with the body rail holes 56.

FIGS. 7A and 7B depict one side of a pin locking system 22 that better ensures pin engagement with the body holes 56 when there is a misalignment between the pins 36 and holes 56. Either conventional pins 36 or the inventive pins 36' may be used in this configuration. It is desirable that the body holes 56 be larger than the pin diameter 36, for example, by as much as 25 percent or more. However, it is to be understood that the relative size between the diameter of the pins 36 and holes 56 may vary based upon the particular trailer slider system. The body holes 56 have centerlines that define a first distance C1 between the centerlines. The pins 36 have centerlines that define a second distance C2 between the centerlines. The distance C2 is greater than the distance C1 (see FIG. 7A). Having the centerline distances unequal from one another and the pins 36 smaller than the holes 56 enables the pins 36 to extend through the holes 56 even when the pins 36 are not aligned with the holes 56. In another embodiment (see FIG. 7B), the distance C2 is less than C1.

For the configuration shown in FIG. 7B, as the body rail 52 slides relative to the frame rail in the forward direction, the forward pin will be received in the forward body hole 56. As the body rail 52 continues to move forward, the rearward pin will extend through the rearward body hole 56 so that opposing sides of the pins 36 are in close proximity to opposing sides of the holes 56 on that rail. In this manner, at least one pin on each side will be engaged in a hole to prevent relative movement between the body rail and side rail. As illustrated in FIG. 5A, prior art systems require more precise alignment between the centerline of the pin 36 and body hole 56. The configuration shown in FIG. 7A operates similarly to the embodiment shown in FIG. 7B, except the rear pin engages the hole first.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A trailer slider including a body rail longitudinally slideable relative to a suspension frame side rail, one of the body and suspension frame side rails having holes providing multiple suspension positions, the holes having a first centerline, the trailer slider comprising:
    a pin locking system having a pin movable between retracted and locked positions, an end of said pin arranged to extend through one of the holes in said locked position, said pin having a second centerline, said end arranged to extend through the hole with said first centerline and said second centerline offset from one another in said locked position; and
    wherein said holes are formed within said one of said body and suspension frame side rails to extend through a thickness from an inner face to an outermost face, said pin extending through one of said holes with at least a portion of said end of said pin extending beyond the outermost face in said locked position.

2. The trailer slider according to claim 1, wherein said end includes an apex and a periphery spaced axially from said apex and including opposing sides, and a tapered surface extending from said apex to one of said opposing sides at a first angle, and said other of said opposing sides having a locking surface at a second angle to said tapered surface different than said first angle.

3. The trailer slider according to claim 2, wherein said second centerline is offset from said apex.

4. The trailer slider according to claim 2, wherein said tapered surface is a generally planar surface.

5. The trailer slider according to claim 2, wherein said tapered surface extends from one opposing side to the other opposing side.

6. The trailer slider according to claim 5, wherein said apex lies along one of said opposing sides.

7. The trailer slider according to claim 6, wherein said locking surface forms a portion of said periphery on said other of said opposing sides.

8. The trailer slider according to claim 2, wherein said apex is a point.

9. The trailer slider according to claim 1, wherein said end includes a tapered surface extending to an apex and a periphery including opposing sides, and with said tapered surface extending from said apex to one of said opposing sides at an angle, and wherein said second centerline is offset from said apex.

10. A trailer slider including a body rail longitudinally slideable relative to a suspension frame side rail, one of the body and suspension frame side rails having holes providing multiple suspension positions, the holes having a first centerline, the trailer slider comprising:
    a pin locking system having a pin movable between retracted and locked positions, an end of said pin arranged to extend through one of the holes in said locked position, said pin having a second centerline, said end arranged to extend through the hole with said first centerline and said second centerline offset from one another in said locked position, and
    wherein said pin locking system includes first and second locking pins, said first and second locking pins on a same side of the trailer slider and arranged to be proximate to first and second holes with said first centerlines of said first and second holes arranged to define a first distance, said second centerlines of said first and second locking pins defining a second distance and arranged to be unequal to said first distance.

11. The trailer slider according to claim 10, wherein said second distance is arranged to be greater than said first distance.

12. The trailer slider according to claim 10, wherein said first and second locking pins are sized to be substantially smaller than said first and second holes.

13. The trailer slider according to claim 12, wherein said first and second locking pins are sized to be at least 25% narrower than said first and second holes.

14. The trailer slider according to claim 12, wherein said first and second locking pins are arranged to be in close proximity to opposing sides of said first and second holes relative to one another in said locked position.

15. A trailer slider including a body rail longitudinally slideable relative to a suspension frame side rail, one of the body and suspension frame side rails having holes providing multiple suspension positions, the holes having a first centerline, the trailer slider comprising:
    a pin locking system having a pin movable between retracted and locked positions, an end of said pin arranged to extend through one of the holes in said locked position, said pin having a second centerline, said end arranged to extend through the hole with said first centerline and said second centerline offset from one another in said locked position; and
    wherein a second end opposite said end includes an aperture receiving an end of a linkage from said pin locking system with said pin in said retracted position and a second pin opposite said pin in said locked position.

16. A trailer slider including a body rail longitudinally slideable relative to a suspension frame side rail, one of the body and suspension frame side rails having holes providing multiple suspension positions, the trailer slider comprising:
    a pin locking system having pins movable between retracted and locked positions, ends of said pins arranged to be received in said holes in a locked position, opposite ends of said pins including apertures, one of said pins receiving an actuating linkage in said aperture in a bound position with another of said pins in said locked position.

17. The trailer slider according to claim 16, wherein said actuating linkage is movable out of said aperture when not in said bound position.

18. A trailer slider including a body rail longitudinally slideable relative to a suspension frame side rail, the body rail having plurality of holes providing multiple suspension positions, each of the plurality of holes having a first centerline, the trailer slider comprising:
- a pin locking system having at least one pin movable between retracted and locked positions, an end of said at least one pin arranged to extend through one of the plurality of holes such that at least a portion of said end extends beyond an outer surface of the body rail to achieve said locked position;
- wherein said at least one pin has a second centerline with said end arranged to extend through said one of the plurality of holes with said first centerline and said second centerline offset from one another in said locked position; and
- wherein said at least one pin comprises at least first and second locking pins and said plurality of holes includes at least first and second holes, with said first and second locking pins being located on a same side of the trailer slider and arranged to be proximate to said first and second holes with the first centerlines of said first and second holes arranged to define a first distance, said second centerlines of said first and second locking pins arranged to define a second distance that is unequal to the first distance.

19. The trailer slider according to claim 18 wherein said end includes a tapered surface extending to an apex and a periphery including opposing sides, and with said tapered surface extending from said apex to one of said opposing sides at an angle, and wherein said second centerline is offset from said apex.

20. A trailer slider including a body rail longitudinally slideable relative to a suspension frame side rail, the body rail having plurality of holes providing multiple suspension positions, each of the plurality of holes having a first centerline, the trailer slider comprising:
- a pin locking system having at least one pin movable between retracted and locked positions, an end of said at least one pin arranged to extend through one of the plurality of holes such that at least a portion of said end extends beyond an outer surface of the body rail to achieve said locked position; and
- wherein said at least one pin has a second centerline with said end arranged to extend through said one of the plurality of holes with said first centerline and said second centerline offset from one another in said locked position,
  - wherein said at least one pin comprises at least first and second locking pins with said first and second locking pins being located on opposite sides of the trailer slider from each other, and wherein said ends of said first and second locking pins are arranged to be received in one of said plurality of holes in a locked position;
  - wherein each of said first and second locking pins includes a pin body extending from said end to an opposite end, with an aperture being formed within said opposite end of said pin body in a direction extending generally along the second centerline; and
  - wherein one of said first and second locking pins receives an actuating linkage in said aperture in a bound position with the other of said first and second locking pins being in said locked position, and wherein said actuating linkage is removable from said aperture when said one of said first and second locking pins is no longer in said bound position.

\* \* \* \* \*